(12) United States Patent
Wasson et al.

(10) Patent No.: US 11,130,204 B2
(45) Date of Patent: Sep. 28, 2021

(54) FIELD DISSIMILAR METAL WELDING TECHNOLOGY FOR ENHANCED WEAR RESISTANT HIGH MANGANESE STEEL

(71) Applicants: EXXONMOBIL RESEARCH AND ENGINEERING COMPANY, Annandale, NJ (US); POSCO, Pohang-Si (KR)

(72) Inventors: Andrew J. Wasson, Spring, TX (US); Douglas P. Fairchild, Sugar Land, TX (US); HyunWoo Jin, Easton, PA (US); Xin Yue, Spring, TX (US); IlWook Han, Pohang (KR); Sangchul Lee, Pohang (KR); Bongkeun Lee, Pohang (KR); Jongsub Lee, Seoul (KR)

(73) Assignees: ExxonMobil Research and Engineering Company, Annandale, NJ (US); Poseo, Pohang-Si (KR)

( * ) Notice: Subject to any disclaimer, the term of this patent is extended or adjusted under 35 U.S.C. 154(b) by 430 days.

(21) Appl. No.: 15/584,835

(22) Filed: May 2, 2017

(65) Prior Publication Data
US 2017/0312862 A1    Nov. 2, 2017

Related U.S. Application Data

(60) Provisional application No. 62/330,405, filed on May 2, 2016.

(51) Int. Cl.
*B23K 35/00* (2006.01)
*C22C 38/58* (2006.01)
(Continued)

(52) U.S. Cl.
CPC ............. *B23K 35/38* (2013.01); *B23K 9/232* (2013.01); *B23K 35/004* (2013.01); *B23K 35/02* (2013.01);
(Continued)

(58) Field of Classification Search
None
See application file for complete search history.

(56) References Cited

U.S. PATENT DOCUMENTS

| 4,017,711 A | 4/1977 | Honma et al. |
| 5,798,004 A * | 8/1998 | Tamehiro ............. C21D 8/0226 148/336 |

(Continued)

FOREIGN PATENT DOCUMENTS

| CA | 2930363 A1 | 6/2011 |
| CA | 2929524 A1 | 6/2015 |

(Continued)

OTHER PUBLICATIONS metalsupermarkets.com, "The Four Types of Steel" (Year: 2015).*

(Continued)

*Primary Examiner* — Stefanie J Cohen
*Assistant Examiner* — Christopher D. Moody
(74) *Attorney, Agent, or Firm* — Vorys, Sater, Seymour and Pease LLP (57) ABSTRACT

The present disclosure relates to a welding composition for joining high manganese steel base metals to low carbon steel base metals, as well as systems and methods for the same. The composition includes: carbon in a range of about 0.1 wt % to about 0.4 wt %; manganese in a range of about 15 wt % to about 25 wt %; chromium in a range of about 2.0 wt % to about 8.0 wt %; molybdenum in an amount of ≤ about 2.0 wt %; nickel in an amount of ≤ about 10 wt %; silicon in an amount of ≤ about 0.7 wt %; sulfur in an amount of ≤ about 100 ppm; phosphorus in an amount of ≤ about 200 ppm; and a balance comprising iron. In an embodiment, the composition has an austenitic microstructure.

8 Claims, 3 Drawing Sheets

(51) Int. Cl.
*B23K 35/30* (2006.01)
*C22C 38/02* (2006.01)
*C22C 38/22* (2006.01)
*C22C 38/44* (2006.01)
*C22C 38/48* (2006.01)
*C22C 38/50* (2006.01)
*C22C 38/38* (2006.01)
*B23K 9/23* (2006.01)
*B23K 35/38* (2006.01)
*B23K 35/02* (2006.01)

(52) U.S. Cl.
CPC .......... *B23K 35/0261* (2013.01); *B23K 35/30* (2013.01); *B23K 35/3073* (2013.01); *C22C 38/02* (2013.01); *C22C 38/22* (2013.01); *C22C 38/38* (2013.01); *C22C 38/44* (2013.01); *C22C 38/48* (2013.01); *C22C 38/50* (2013.01); *C22C 38/58* (2013.01)

(56) References Cited

U.S. PATENT DOCUMENTS

| 9,394,579 | B2 | 7/2016 | Um |
| 2013/0174941 | A1 | 7/2013 | Um |
| 2015/0129559 | A1* | 5/2015 | Fairchild .............. B23K 35/308 219/73 |
| 2016/0271739 | A1* | 9/2016 | Lee ........................ B23K 35/30 |
| 2016/0271740 | A1 | 9/2016 | Lee et al. |
| 2016/0273083 | A1* | 9/2016 | Lee ........................ B23K 35/30 |

FOREIGN PATENT DOCUMENTS

| CN | 105345233 A | 2/2016 | |
| JP | 10-166179 | 6/1998 | |
| KR | 10-2015-0105623 | 9/2015 | |
| WO | WO 2012-092122 | 7/2012 | |
| WO | PCT/US2014/020599 | 9/2014 | |
| WO | WO 2014-149732 | 9/2014 | |
| WO | WO 2015-083878 | 6/2015 | |
| WO | WO-2015083878 A1 * | 6/2015 | ............. B23K 35/30 |
| WO | WO-2015083928 A1 * | 6/2015 | ............. B23K 35/30 |

OTHER PUBLICATIONS

European Search Report in corresponding EP Application No. 17793187.0 dated Nov. 7, 2019.
G T Murray, Carbon and Low-Alloy Steels, Handbook of Materials Selection for Engineering Applications, 1997, p. 125, Marcel Dekker Inc, New York, NY.
Japanese office action dated Oct. 27, 2020 and an English summary of same.

* cited by examiner

FIELD DISSIMILAR METAL WELDING TECHNOLOGY FOR ENHANCED WEAR RESISTANT HIGH MANGANESE STEEL

CROSS REFERENCE TO RELATED APPLICATIONS

This application claims the benefit of and priority to U.S. Provisional Application Ser. No. 62/330,405 filed May 2, 2016, the disclosure of which is herein incorporated by reference in its entirety.

FIELD

This disclosure relates to the field of welding metals. More particularly, the disclosure relates to materials and methods for producing weld metal required to join low carbon steel components to high manganese (Mn) steel components having enhanced wear resistance.

BACKGROUND

Piping systems in mining operations (including the oil sands mining industry) are used to transport mixtures of solid rock and sand particles in a liquid or slurry to a processing plant and to recycle debris back to the mining area or to a storage area. Current slurry hydro-transport pipes are typically made from low carbon, pipeline grade steel (e.g., API specification 5L X65 or X70 grade steels). These pipes are subjected to significant abrasive/erosive wear and corrosion that causes wall loss and leads to frequent repairs and replacements. As such, these piping systems are often the source of significant operational costs for mining projects. There are significant economic incentives to develop pipe materials with improved erosion/wear/corrosion resistance.

There also exists a need for enhanced wear resistant steel in the oil sands mining industry. Such oil sands deposits have been commercially recovered since the 1960's, and the recovery rate has grown in recent years. Bitumen ore has generally been extracted either by surface mining techniques for shallow deposits (e.g., less than 100 m depth), or by in-situ thermal extraction (e.g., involving the injection of steam, chemical solvents and/or mixtures thereof) for deep deposits located deeper underground (e.g., around 100 m or deeper). For the surface mining of shallow oil sands, many types of heavy equipment and pipelines are utilized.

First, the oil sands are typically excavated using shovels which transfer the mined material to trucks/vehicles. The vehicles move the oil sand ores to ore preparation facilities, where the mined ore is typically crushed and mixed with hot water. The oil sands slurries are then typically pumped through hydro-transport pipelines to the primary separation cell (PSC), where the oil bitumen is generally separated from the sand and water. After the bitumen is separated, the remaining sand and water slurry is then transported through tailings pipelines to tailings ponds for sands to settle down. The hydro-transport of large amounts of slurry mixture causes significant metal loss in conventional metallic pipelines or the like, which results in short replacement cycles and considerable operational costs.

Thus, the oil sands mining and ore preparation processes involve several stress and/or impact abrasion challenges in multiple equipment/operational areas (e.g., shovel teeth, hoppers, crushers, conveyers, vibrating screens, slurry pumps, pipelines, etc.). For example, in the downstream slurry transportation and extraction processes, some of the challenges encountered in the equipment, pipelines (e.g., hydro-transport pipelines), pumps and/or the PSC include erosion, erosion/corrosion, corrosion, stress, wear and/or abrasion or the like of the equipment/materials. These equipment/material erosion/corrosion challenges or the like lead to significant repair, replacement and/or maintenance costs, as well as to production losses.

As noted, current piping structures for slurry hydro-transport are typically made from low carbon, pipeline grade steel (e.g., API specification 5L X70). In general, fast moving solids in the slurry flow can cause considerable metal loss from the pipes (e.g., metal loss of the inner pipe wall). The aqueous and aerated slurry flow also typically causes accelerated pipe erosion by creating a corrosive environment. Moreover, particulate matter in the slurry (under the influence of gravity) causes damage along, inter alia, the bottom inside half of the pipes. For example, the hydro-transport and tailings pipelines that carry the sand and water slurry in oil sands mining operations undergo severe erosion-corrosion damage during service, while the bottom part (e.g., at the 6 o'clock position) of the pipeline typically experiences the most severe erosion wear.

In order to extend the service life of the pipelines some mine operators have utilized the practice of periodically rotating pipelines. For example, the pipelines are occasionally rotated (e.g., after about 3000 hours of service) by about 90°. After about three rotations (e.g., after about 12000 hours of service), the pipelines are typically fully replaced. Various materials, such as martensitic stainless steels, hardfacing materials (e.g., WC-based, chromium-carbide based), and polymer lining materials (e.g., polyurethane), have been evaluated and used by oil sands mining operators. However, such materials have found only niche applications, typically due to either relatively poor wear/erosion performance (e.g., polymer liner), high material/fabrication costs (e.g., WC-based hard metal, chromium-carbide based hard metal overlay material), or limited available thicknesses (e.g., bi-metallic multi-layer hardened steel materials). However, pipe erosion and the like remains a serious problem, and alternative pipe structures and/or materials are sought to allow for a more efficient/economical operation/solution.

Improved steel compositions having enhanced erosion/wear/corrosion performance have been developed recently to reduce operational costs in mining operations. Specifically, improved high Mn steel with enhanced wear/erosion/corrosion resistance has been developed for oil sands mining applications, including slurry pipes. In order to be successfully implemented, high Mn steel slurry pipe sections must be joined together in the field to create high Mn steel slurry pipelines. Slurry pipelines are constructed using several different types of joining methods, including: girth butt welds, flanges, and mechanical couplings. Many of the flange systems and mechanical coupling systems require that a metallic ring (often low carbon steel) be joined to the outside of the pipe section at the pipe end. The welds used to join high Mn steel slurry pipe to low carbon steel rings and flanges need to provide the required strength and toughness and also should be applied during field construction without undue concern regarding "weldability" or ease of use.

Currently available welding technologies are not sufficient for joining erosion resistant high Mn steel to low carbon steel components. High Mn steel weld metals developed to date to join sections of erosion resistant high Mn steel together have chemistries that are largely incompatible with low carbon steels. Conventional high Mn steel consumables used to weld cast Hadfield steel (commonly used in railway components) do not provide sufficient weld metal strength to be used to join the recently developed erosion resistant high Mn steel to carbon steel for high erosion/wear/corrosion applications, e.g., oil sands applications. High Mn steel welding consumables used for hard-facing applications cannot consistently provide the required weld metal toughness levels for these dissimilar metal welding applications.

U.S. Patent Application Publication No. 2013/0174941 describes high Mn steel developed for cryogenic applications such as storage containers for liquefied natural gas (LNG). Weld metals have been developed for cryogenic high Mn steel, such as those described in J. K. Choi, et al, "High Manganese Austenitic Steel for Cryogenic Applications", Proceedings of the $22^{nd}$ International ISOPE Conference, Rhodes, Greece 2012. These cryogenic high Mn steel weld metals, while providing sufficient toughness at very low temperatures down to −200° C., do not provide adequate weld metal strength for joining erosion resistant high Mn steel to low carbon steel components in applications that involve high levels of erosion, erosion/corrosion, corrosion, stress, wear and/or abrasion, such as, the conditions found in oil sands applications.

Thus, a need exists for welding technology that can be used to construct, e.g., high Mn steel slurry pipelines for oil sands mining projects, that simultaneously produces adequate strength and adequate toughness that can be applied during high Mn steel pipeline field construction and field joining of other low carbon steel components to erosion resistance high Mn steel components without undue concern regarding weldability or ease of use.

SUMMARY

In certain aspects, the present description provides a weld metal and method of use that achieve adequate strength and toughness for joining, e.g., low carbon steel components to erosion resistant high Mn steel components (e.g., high Mn steel slurry pipe or other soil sands components). The present disclosure provides weld metal chemistries, welding processes, and control of welding practices that produce suitable weld microstructures and mechanical properties for the application.

In certain embodiments, the weld metal comprises between about 0.1 and about 0.4 wt % carbon, between about 15.0 and about 25.0 wt % manganese, between about 2 wt % and about 8 wt % chromium, not greater than about 2 wt % of molybdenum, between about 3 and 10.0 wt % of nickel, not greater than about 1.0 wt % silicon, not greater than about 200 ppm sulfur, and not greater than about 200 ppm phosphorus, and the balance is Fe (e.g., about 70%). In another embodiment, other elements that may be added to enhance weld metal properties (e.g., strength or toughness) is not greater than about 0.7 wt % titanium.

In a particular embodiment, the weld metal comprises at least one of: about 0.1-0.3 wt % carbon; about 18.0-22.0 wt % manganese; about 3.5-6.5 wt % chromium; less than about 1.5 wt % molybdenum; about 5.5-8.5 wt % nickel; about 0.4-0.8 wt % silicon; less than about 150 ppm sulfur; and not greater than 0.7 wt % titanium.

In an embodiment, the weld metal comprises less than or equal to 0.7 wt % titanium.

In further embodiments, he weld metal comprises about 0.15-0.45 wt % titanium.

In another embodiment, the welding metal microstructure has an austenite phase. In a particular embodiment, the austenite phase can transform into hard α'-martensite and undergoes microtwinning upon straining.

In another aspect, the description provides a system for applying the weld metal uses welding equipment and parameters that enable control of weld arc stability and weld pool flow characteristics such as viscosity and bead shape to provide acceptable weldability. In certain embodiments, the system for providing welds joining high Mn steel and low carbon steel comprises a consumable wire electrode and a gas metal arc welding power source that perform gas metal arc welding. In certain embodiments, the consumable wire electrode comprises carbon in a range of from about 0.1 wt % to about 0.4 wt %, manganese in a range of from about 15 wt % to about 25 wt %, chromium in a range of from about 2 wt % to about 8 wt %, molybdenum in an amount of less than or equal to about 2 wt %, nickel in an amount of from about 3 to about 10 wt %, silicon in an amount of less than or equal to about 1.0 wt %, sulfur in an amount of less than or equal to about 150 ppm, phosphorus in an amount of less than or equal to about 200 ppm, and a balance comprising iron. The gas metal arc welding power source produces a welding heat input no more than about 2.5 kJ/mm.

In a particular embodiment, the consumable wire electrode comprises at least one of: about 0.1-0.3 wt % carbon; about 18.0-22.0 wt % manganese; about 3.5-6.5 wt % chromium; less than about 1.5 wt % molybdenum; about 5.5-8.5 wt % nickel; about 0.4-0.8 wt % silicon; less than about 150 ppm sulfur; and not greater than 0.7 wt % titanium.

In another embodiment, the welding heat input is in a range of about 0.6 kJ/mm to about 1.0 kJ/mm.

In an additional aspect, the description provides a method for applying a weld metal as described herein. In certain embodiments, the method includes applying a weld metal as described herein with welding equipment and parameters that enable control of weld pool flow characteristics, such as viscosity and bead shape, to provide acceptable weldability. The weld metal chemistry, weld joint geometry, and welding input are controlled to ensure reduced susceptibility to solidification cracking and prevent significant degradation of weld metal and heat affected zone (HAZ) toughness in an erosion resistant high Mn steel base metal and a low carbon steel base metal. In a preferred embodiment, the weld metal of the present disclosure has a microstructure comprising austenite grains.

In further aspects, the description provides methods of producing a weld deposit for joining erosion resistant high Mn steel and low carbon steel. The method comprising: providing a high Mn steel base and a low carbon steel base to be welded and a welding filler metal; and melting and cooling the welding filler material to create a weld deposit. In certain embodiments, the welding filler metal comprises carbon in a range of about 0.1 wt % to about 0.4 wt %, manganese in a range of about 15 wt % to about 25 wt %, chromium in a range of about 2 wt % to about 8 wt %, molybdenum in an amount not greater than about 2 wt %, nickel in an amount not greater than about 10 wt %, silicon in an amount not greater than about 1.0 wt %, sulfur in an amount not greater than about 100 ppm, phosphorus in an amount not greater than about 200 ppm, and a balance comprising iron.

In certain embodiments, melting comprises applying a welding heat input no more than about 2.5 kJ/mm to the welding filler metal.

In a particular embodiment, the bases comprise a portion to be welded, the portions having bevels of greater than about 25 degrees.

In another embodiment, the weld deposition has a yield strength in the as-welded condition greater than a yield strength of the low carbon steel base or greater than a required minimum yield strength.

In certain embodiments, the weld deposit has a has at least one of a yield strength in the as-welded condition greater than about 70 ksi, an ultimate tensile strength in the as-welded condition greater than 70 ksi, and a CVN in the as-welded condition greater than about 27 J at −29° C.

In additional embodiments, a heat affected zone of the base metals has a CVN after welding greater than about 27 J at −29° C.

In any of the aspects or embodiments described herein, the base metal or base steel is an erosion/corrosion resistant high Mn steel.

In any of the aspects or embodiments described herein, the method further comprises limiting carbon content in the weld metal to an amount less than an amount of carbon in a heat affected zone of the high Mn steel base metal.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages objects and embodiments are expressly included within the scope of the present disclosure. The publications and other materials used herein to illuminate the background of the disclosure, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure.

DETAILED DESCRIPTION

Figure 1A:
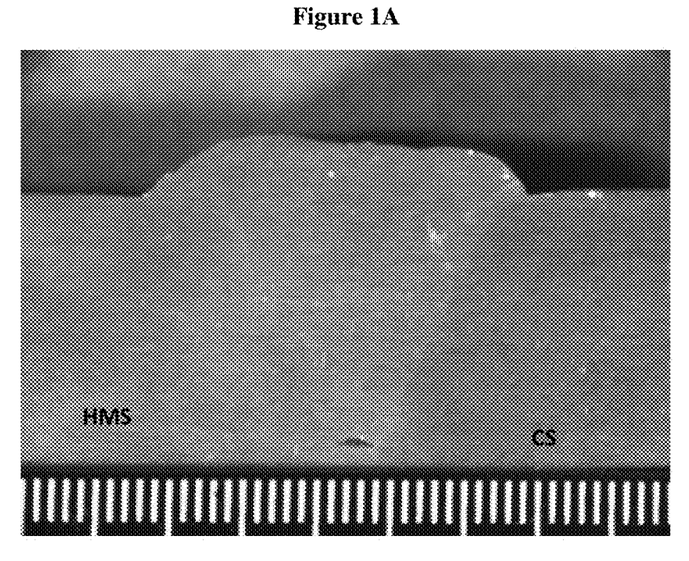
FIGS. 1A, 1B, and 1C are dissimilar weld macros for a high Mn steel to a carbon steel in accordance with an embodiment.
Figure 1B:
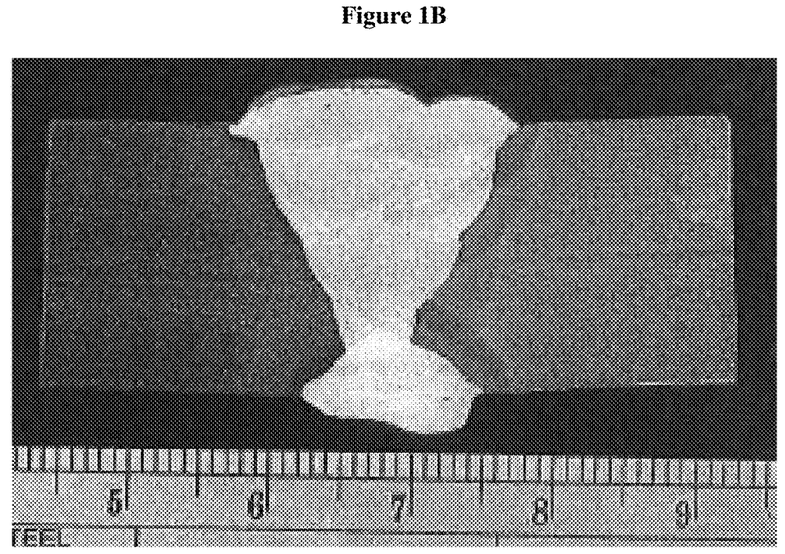
Figure 1C:
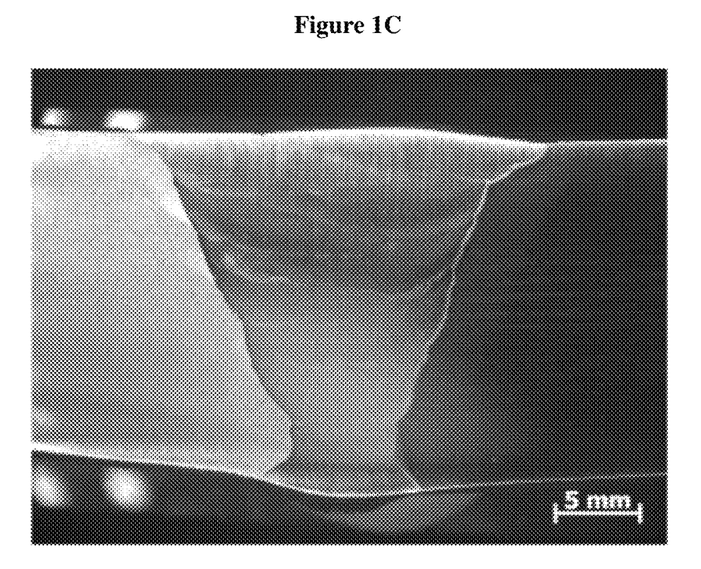
Figure 2:
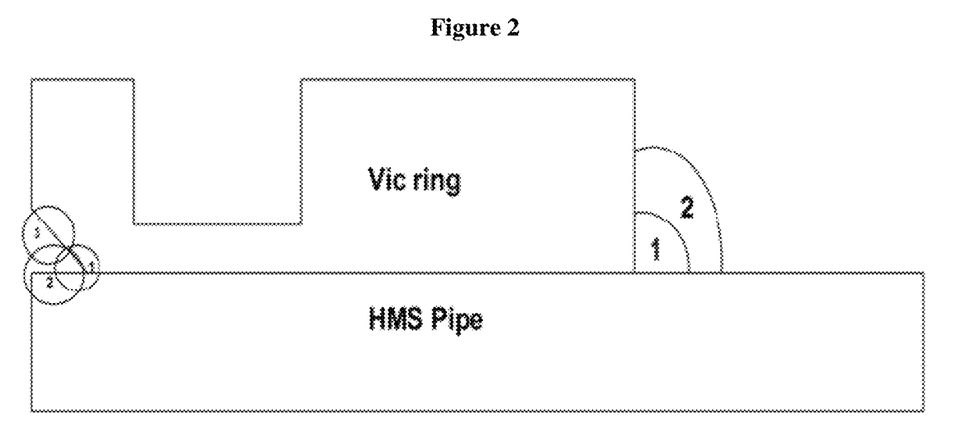
FIG. 2 is a schematic showing Victaulic ring to HMS pipe weld and weld bead sequences.
Figure 3:
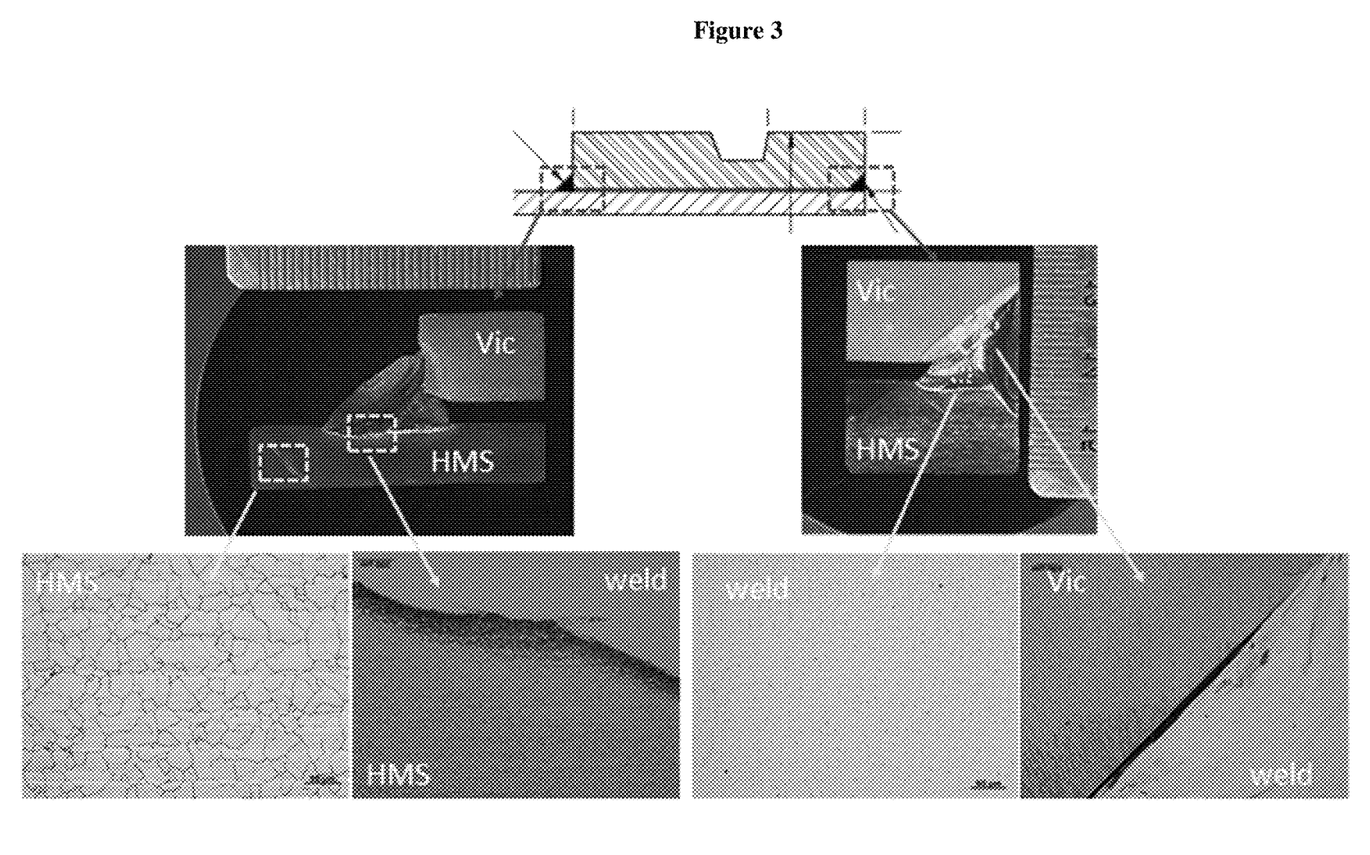
FIG. 3 are weld cross-section macros showing welds joining carbon steel Victaulic rings to erosion resistant high Mn steel pipes.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. The disclosure is not limited to the specific embodiments described below, but rather, it includes all alternatives, modifications, and equivalents falling within the spirit and scope of the appended claims.

Due to the concentration of carbon, nickel, and manganese in high Mn steel weld metals, as compared to typical carbon-manganese steel welds, high Mn steel weld metals are challenging to apply with traditional welding techniques. High Mn steel weld metals are substantially more viscous when molten, as compared to conventional low carbon steel weld metals. The increased viscosity of the molten high Mn steel weld metals can result in lack of fusion defects at weld toes located between the weld edges and the base metal. Moreover, the toughness of the high Mn steel base metal is sensitive to thermal cycles from welding. As a result, if the heat input during welding is too high, the high Mn steel base metal HAZ can result in an unacceptable level of toughness. Furthermore, the weld metals solidify as primary austenite. The welds are, therefore, prone to solidification cracking if the weld metal composition and weld bead profile are not properly controlled.

Presently described are systems and methods that relate to the surprising and unexpected discovery that one can apply the dissimilar weld, high Mn steel (DMW-HMS) of the present disclosure in the field to join high Mn steel components with low carbon steel components with superior strength and toughness.

The various aspects and embodiments are exemplified in the context of high manganese steel components used for oil sands production. However, embodiments of the present disclosure are clearly of wider application to any welding of erosion/wear resistant high manganese steel components to low carbon steel components in which a weldment with adequate weldability, strength and toughness is required. Other such applications include, e.g., the welding of erosion resistant high Mn steel plates to structural low carbon steel or low carbon steel fixtures. Various terms are defined in the following specification.

Where a range of values is provided, it is understood that each intervening value between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either or both of those included limits are also included in the disclosure.

The following terms are used to describe the present disclosure. In instances where a term is not specifically defined herein, that term is given an art-recognized meaning by those of ordinary skill applying that term in context to its use in describing the present disclosure.

All numerical values within the detailed description and the claims herein are modified by "about" or "approximately" the indicated value, and take into account experimental error and variations that would be expected by a person having ordinary skill in the art.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Unless otherwise defined, all technical and scientific terms used herein have the same meaning as commonly understood by one of ordinary skill in the art to which this present disclosure belongs. The terminology used in the description of the present disclosure herein is for describing particular embodiments only and is not intended to be limiting of the present disclosure.

Definitions:

Ductility: can mean, but is in no way limited to, a measure of a material's ability to undergo appreciable plastic deformation before fracture; it may be expressed as percent elongation (% EL) or percent area reduction (% AR).

Corrosion Resistance: can mean, but is in no way limited to, a material's inherent resistance to deterioration caused by exposure to a reactive or corrosive environment.

Toughness: can mean, but is in no way limited to, resistance to crack initiation and propagation.

Yield Strength: can mean, but is in no way limited to, the ability of a material to bear load without deformation.

Tensile Strength: can mean, but is in no way limited to, that strength corresponding to the maximum load carrying capability of the material in units of stress when the failure mechanism is not linear elastic fracture.

Cooling rate: can mean, but is in no way limited to, the rate of cooling of a piece of material, which in general is measured at the center, or substantially at the center, of a piece of material.

Heat-affected-zone (HAZ): can mean, but is in no way limited to, the base metal that is adjacent to the weld fusion line, which is not melted during the welding operation, but is affected by the heat of welding.

Weldment: can mean, but is in no way limited to, an assembly of component parts joined by welding.

Weld bead penetration profile: can mean, but is in no way limited to, the shape of the weld bead near the bottom (root) of the weld bead when observed in a transverse cross-section.

Weldability: can mean, but is in no way limited to, the feasibility of welding a particular metal or alloy. Sometimes weldability refers to the susceptibility or hydrogen induced cracking during welding, but in the context of this disclosure, weldability refers to the ease of welding without creating defects such as lack of fusion, lack of penetration, or undercut. A number of factors contribute to poor weldability including a high surface tension molten weld pool and an erratic or unstable welding arc. These factors create symptoms observed by the welder including poor wetting of the weld pool in the adjacent base metal, sharp (or small) reentrant angles at the weld toes and undesirable weld spatter. Obtaining good weldability refers to a group of attributes including good weld pool fluidity, arc stability ("smooth" arc), good wetting of the weld pool at the junction with the base metal, good bead penetration geometry (all aimed at reducing weld defects).

Gas metal arc welding (GMAW): a welding process that utilizes a torch whereby the filler wire acts as the electrode, is automatically fed through a contact tip, and is consumed in the welding process. The contact tip is typically surrounded by a gas cup that directs shielding gas to the area of the welding arc. Common shielding gases are argon, carbon dioxide, helium, and oxygen. Torch travel can be provided by a machine (automatic or mechanized) or can be provided by a human (semiautomatic). The process name GMAW is a standards designation of the American Welding Society.

Pulsed gas metal arc welding (PGMAW): A variation of the GMAW process that utilizes power sources that provide current pulsing capabilities. These are sometimes referred to as advanced current waveform power sources. The American Welding Society has termed PGMAW as GMAW-P.

GMAW-based processes: A number of allied processes similar to GMAW such as PGMAW, metal core arc welding (MCAW), and flux core arc welding (FCAW). The primary difference with MCAW is that a cored wire is used and there exists metal powders within the core. The FCAW process also uses a cored wire and the core typically consists of flux powders. FCAW may be used with or without shielding gas.

Austenite: can mean, but is in no way limited to, a metallurgical phase in steels that has a face-centered cubic (FCC) atomic crystalline structure.

Martensite: can mean, but is in no way limited to, a metallurgical phase in steels that can be, but not limited to, formed by diffusionless phase transformation in which the parent (typically austenite) and product phases have a specific orientation relationship.

ε(epsilon)-martensite: can mean, but is in no way limited to, a specific form of martensite having hexagonal close packed atomic crystalline structure which forms upon cooling or straining of austenite phase. ε-martensite typically forms on close packed (111) planes of austenite phase and is similar to deformation twins or stacking fault clusters in morphology.

α'(alpha prime)-martensite: can mean, but is in no way limited to, a specific form of martensite having body-centered cubic (BCC) or body-centered tetragonal (BCT) atomic crystalline structure which forms upon cooling or straining of austenite phase; α'-martensite typically forms as platelets.

Carbide: can mean, but is in no way limited to, a compound of iron/metal and carbon.

Weld Metal Composition:

In an aspect, the description provides an austenitic weld metal that is applied using a modern gas metal arc welding (GMAW) process. This produces an austenitic microstructure useful for welding erosion resistant high Mn steel components to low carbon steel components capable of simultaneously achieving suitable strength, suitable low temperature toughness in both the weld metal and base metal heat affected zones, and welds with low defect rates. Embodiments of the present disclosure obtain good weldability, which refers to a group of attributes including good weld pool fluidity, arc stability ("smooth" arc), good wetting of the weld pool at the junction with the base metals, and good bead penetration geometry, all of which are aimed at reducing weld defects.

The DMW-HMS weld metal chemistry can, in combination with the base metal HMS chemistry and the base metal low carbon steel, be used to calculate the necessary consumable weld wire composition. In a similar fashion, the consumable weld wire chemistry, the base metal HMS chemistry, and the base metal low carbon steel chemistry can be used to calculate the DMW-HMS weld metal chemistry. The DMW-HMS chemistry can be applied to a variety of HMS and low carbon steel base metals by alteration of the weld wire chemistry and knowledge of the welding process that controls the amount of penetration and base metal dilution. As is known to those skilled in the art of welding engineering, dilution calculations can be used to determine one of four chemistries when three of the chemistries are known or specified. In the case of welding HMS-carbon steel components (e.g., low carbon steel ring to HMS slurry pipe), there are four metals involved; the HMS base metal, the low carbon steel base metal, the weld metal, and the filler wire. For the application of MCAW welding described here, dilution is typically 5% to 20% for the majority of the weld passes. Dilution calculations are known in the art and are explained in a number of welding engineering textbooks including Welding Metallurgy, Volume 2, Third Edition, by George E. Linnert that was published by The American Welding Society.

The weld metal of the present disclosure produces adequate mechanical properties for dissimilar metal welds joining, e.g., low carbon steel rings and flanges to erosion resistant high Mn steel (HMS), e.g., HMS slurry pipes. These novel welds are suitable for slurry pipelines and can be applied during field construction with acceptable weldability and defect rates. The weld metal desired for a particular application is designed through choice of the weld metal chemistry and the welding method and can be applied in conditions of rugged field pipeline construction to produce suitable weld microstructure and mechanical properties.

In an embodiment, the weld metal comprises carbon in a range of about 0.1 wt % to about 0.4 wt %, manganese in a range of about 15 wt % to about 25 wt %, chromium in a range of about 2.0 wt % and 8.0 wt %, molybdenum in an amount no greater than about 2.0 wt % molybdenum, nickel in an amount no greater than about 10 wt %, silicon in an amount no greater than about 1.0 wt %, sulfur in an amount no greater than about 200 ppm sulfur, phosphorus in an amount no greater than about 200 ppm phosphorus, and the balance is iron. All percentages herein relating to composition of the weld metal are expressed in weight percent (wt %), unless otherwise specifically stated. While the balance of the weld metal composition is iron, it is possible the weld metal may include other unlisted components, for example impurities or the like.

In some embodiments, the weld metal comprises at least one of: about 0.1-0.3 wt % carbon; about 18.0-22.0 wt % manganese; about 3.5-6.5 wt % chromium; less than about 1.5 wt % molybdenum; about 5.5-8.5 wt % nickel; about 0.4-0.8 wt % silicon; less than about 150 ppm sulfur; and not greater than about 0.7 wt % titanium.

Other elements may be added for other reasons as outlined below. For example, titanium may be added in amounts not greater than about 0.7 wt % (e.g., about 0.15 to about 0.45 wt % titanium).

The high Mn steel weld metals described in the present disclosure are required to meet minimum mechanical properties of base metal high Mn steel and base metal low carbon steel used for applications where the two steels need to be joined by welds, e.g., slurry pipe applications. As such, DMW-HMS weld metal microstructure can be appropriately compatible with both erosion resistant HMS base metal and low carbon steel microstructure. In an embodiment, the appropriate weld metal microstructure for this purpose consists of metastable austenite phase with a face centered cubic (fcc) structure at room temperature.

Upon straining, the metastable austenite phase can undergo a number of different phase transformations through strain-induced transformation. These transformations include: austenite phase transforms into microtwins (fcc) structure in which twin is aligned with matrix, ε-martensite (hexagonal lattice), and α'-martensite (body centered tetragonal lattice), depending on specific steel chemistry and/or temperature.

These transformation products are key in producing the unique properties of high Mn steels. For example, fine microtwins effectively segment primary austenite grains and act as strong obstacles for dislocation motion. This effectively refines the grains and results in an excellent combination of high ultimate tensile strength and ductility.

The chemistry of base metal erosion resistant high Mn steel has been specifically tailored to produce transformation products that provide good erosion and wear performance. The base metal is produced to contain a highly metastable austenite phase, which often transforms into hard α'-martensite upon straining. Upon surface wear of these steels, the surface layer of the highly metastable austenite phase can transform to α'-martensite. This friction-induced phase transformation leads to formation of a thin, hard surface layer consisting of martensite over an interior of tough, untransformed metastable austenite. This is a desirable combination for wear/erosion applications. In an embodiment, a high Mn steel base metal is provided as described in 2013EM118, PCT/US2014/020599 entitled "Enhanced Wear Resistant Steel and Methods of Making the Same".

The DMW-HMS weld metal described in the present disclosure to join low carbon steel and erosion resistant HMS is not exposed to erosive service. For example, the DMW-HMS may be used to join low carbon steel rings or flanges to the outside of erosion resistant HMS slurry pipe, and as such, the DMW-HMS is not exposed to the erosive service on the inside of the pipe. Therefore, the wear induced surface transformation to improve erosion resistance, which is required for erosion resistant HMS base metal, is not required for the DMW-HMS weld metal. In an embodiment, the carbon level in the weld metal is controlled at levels significantly lower than the carbon level in the erosion resistant HMS base metal. The lower carbon levels maintain a stable austenite phase to meet strength and low temperature toughness requirements and are more compatible with the low carbon steel base metal. Manganese is the primary element in high Mn steels, and it is important in stabilizing the austenitic structure during cooling and deformation. As such, in an embodiment, manganese levels in the weld metal are similar to that of the base metal.

In austenitic HMS, carbon serves as an effective austenite stabilizer and also strengthens the matrix by solid solution hardening. The reduced carbon levels in the DMW-HMS weld metal necessitate alloying the weld metal with some additional elements to produce the required strength properties.

Silicon additions provide some solid solution strengthening in addition to sustaining the α'-martensite transformation. Silicon also serves to improve the weld pool fluidity during welding, which improves weldability in all welding positions. In an embodiment, the silicon content in the weld metal is increased beyond base metal levels, e.g. up to about 0.7 wt % or about 0.6 wt %, due to the weldability benefits. In a particular embodiment, silicon is present in an amount of about 0.4-0.7 wt %.

Chromium additions increase corrosion resistance and are important to ensure the weld metal corrosion resistance is sufficient for the application. Chromium additions at higher levels also enhance formation of ferrite phase during cooling and lead to formation of carbides during cooling and reheating. In some embodiments, the chromium content is in a range of about 2.0 wt % to about 8.0 wt %. In other embodiments, the chromium content of the weld metal is in a range of about 2.0 wt % to about 8.0 wt %, about 2.0 wt % to about 7.0 wt %, about 2.0 wt % to about 6.0 wt %, about 2.0 wt % to about 5.0 wt %, about 2.0 wt % to about 4.0 wt %, about 2.0 wt % to about 3.0 wt %, about 3.0 wt % to about 8.0 wt %, about 3.0 wt % to about 7.0 wt %, about 3.0 wt % to about 6.0 wt %, about 3.0 wt % to about 5.0 wt %, about 3.0 wt % to about 4.0 wt %, about 4.0 wt % to about 8.0 wt %, about 4.0 wt % to about 7.0 wt %, about 4.0 wt % to about 6.0 wt %, about 4.0 wt % to about 5.0 wt %, about 5.0 wt % to about 8.0 wt %, about 5.0 wt % to about 7.0 wt %, about 5.0 wt % to about 6.0 wt %, about 6.0 wt % to about 8.0 wt %, about 6.0 wt % to about 7.0 wt %, or about 7.0 wt % to about 8.0 wt %. In certain embodiments, the chromium content is about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, or about 8.0 wt %.

Molybdenum additions provide significant solid solution strengthening. Additions of molybdenum are important to achieving the required strength properties in the DMW-HMS weld metal. The weld metal of the present disclose can comprise molybdenum in an amount of less than or equal to about 2.0 wt %.

Nickel additions can provide additional austenite stability and can improve low temperature weld metal toughness. Nickel additions at higher levels, however, can result in a decrease in strength. In some embodiments, the weld metal comprises nickel in an amount of less than or equal to about 10 wt %. In a particular embodiment, nickel is present in an amount of about 7%. In some embodiments, nickel is present in an amount of about 0-10 wt %, about 0-9 wt %, about 0-8 wt %, about 0-7 wt %, about 0-6 wt %, about 0-5 wt %, about 0-4 wt %, about 0-3 wt %, about 0-2 wt %, about 0-1 wt %, about 1-10 wt %, about 1-9 wt %, about 1-8 wt %, about 1-7 wt %, about 1-6 wt %, about 1-5 wt %, about 1-4 wt %, about 1-3 wt %, about 1-2 wt %, about 2-10 wt %, about 2-9 wt %, about 2-8 wt %, about 2-7 wt %, about 2-6 wt %, about 2-5 wt %, about 2-4 wt %, about 0-3 wt %, about 3-10 wt %, about 3-9 wt %, about 3-8 wt %, about 3-7 wt %, about 3-6 wt %, about 3-5 wt %, about 3-4 wt %, about 4-10 wt %, about 4-9 wt %, about 4-8 wt %, about 4-7 wt %, about 4-6 wt %, about 4-5 wt %, about 5-10 wt %, about 5-9 wt %, about 5-8 wt %, about 5-7 wt %, about 5-6 wt %, about 6-10 wt %, about 6-9 wt %, about 6-8 wt %, about 6-7 wt %, about 7-10 wt %, about 7-9 wt %, about 7-8 wt %, about 8-10 wt %, about 8-9 wt %, or about 9-10 wt %. In certain embodiments, weldment comprises nickel in about 0.0 wt %, about 0.5 wt %, about 1.0 wt %, about 1.5 wt %, about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, about 9.5 wt %, or about 10.0 wt %.

There are several additional minor elemental additions that can be made to DMW-HMS weld metals. Titanium in small quantities (e.g., less than or equal to about 0.7 wt % or about 0.15 to about 0.45 wt %) can be added for grain refinement and precipitation hardening purposes to strengthen the weld metal.

Sulfur and phosphorus are impurities and are not intentionally added. These elements are controlled by limiting their amount in the welding consumable. The quantities of sulfur and phosphorus must be controlled in order to avoid weld solidification cracking. For example, in an embodiment, sulfur and phosphorus are each present at a concentration no greater than about 200 ppm.

In some embodiments, the weldment comprises manganese in about 15-25 wt %, about 15-23 wt %, about 15-21 wt %, about 15-19 wt %, about 15-17 wt %, about 17-25 wt %, about 17-23 wt %, about 17-21 wt %, about 17-19 wt %, about 19-25 wt %, about 19-23 wt %, about 19-21 wt %, about 21-25 wt %, about 21-23 wt %, or about 23-25 wt %.

Weld Metallurgy/Microstructure/Mechanical Properties:

The novel DMW-HMS weld metal can provide the required strength and toughness to join erosion resistant HMS components (including slurry pipes) to low carbon steel components. The microstructures required to meet these property requirements are achieved through proper control of weld metal chemistry and welding process parameters.

The DMW-HMS weld metal must achieve the minimum tensile strength properties required for the application (e.g., slurry pipe). For example, the weld metal tensile strength must be greater than the specified minimum ultimate tensile strength (SMUTS) required by the component design for the erosion resistant HMS base material or the low carbon steel component base material, whichever is lowest. In some of the embodiments described here, the SMUTS for the low carbon steel component is lower than the SMUTS for the erosion resistant HMS component. In an embodiment, the DMW-HMS weld metal of the present disclosure achieves all these requirements because it is a highly metastable austenite phase, which transforms into hard $\alpha'$-martensite and undergoes microtwinning upon straining. Additionally, the solid solution strengthening elements in the weld metal (e.g., molybdenum) can provide additional strengthening by disrupting lattice dislocation motion. In an embodiment, the combination of these strengthening mechanisms provides a high strength and work hardening rate that achieves the tensile strength requirements.

The DMW-HMS weld metal must achieve minimum toughness properties required for the application (e.g., slurry pipe). Additionally, the base metals near the weld (the HAZ) must also achieve these minimum toughness properties. The most common assessment of toughness for the intended applications is impact toughness measured by conducting Charpy V-notch (CVN) tests of the weld metal and several regions of the HAZs. The values, reported in units of energy (i.e., joules, J), must be greater than the minimum required CVN as specified by the design code for the application. In an embodiment, the DMW-HMS welds achieve the requirements in the weld metal, the erosion resistant HMS base metal HAZ, and the low carbon steel HAZ. In an embodiment, the weld metal toughness is achieved with a weld metal microstructure of austenite phase and a limited amount of carbides, which results in a ductile fracture mode. The erosion resistant base metal HAZ toughness is achieved by controlling welding heat input such that carbide precipitation in the HAZ is minimized. High heat inputs can lead to excessive carbide precipitation at erosion resistant HMS HAZ grain boundaries and increased hardness in the HAZ, leading to inadequate CVN toughness values. In an embodiment, the low carbon steel HAZ toughness is achieved by controlling heat input. Controlling heat input during welding can avoid the formation of phases with high hardness and low toughness, such as martensite.

In a particular embodiment, the weld metal of the present disclosure has a microstructure comprising austenite grains.

In another embodiment, the weld metal has a yield strength in the as-welded condition: greater than a yield strength of the high manganese steel base and/or the low carbon steel; or greater than a required minimum yield strength.

In an embodiment, the weld metal has a yield strength in the as-welded condition greater than about 70 ksi. In a particular embodiment, the yield strength is greater than about 72.5 ksi, about 75 ksi, about 77.5 ksi, about 80 ksi, or about 82.5 ksi.

In some embodiments, the weld metal has an ultimate tensile strength in the as-welded condition greater than 70 ksi. In a particular embodiment, the ultimate tensile strength is greater than about 85 ksi, about 90 ksi, about 95 ksi, about 100 ksi, about 105 ksi, about 110 ksi, about 115 ksi, about 120 ksi, about 125 ksi, or about 130 ksi.

In another embodiment, the weld metal has a CVN energy in the as-welded condition greater than about 27 J at $^-29°$ C. In a particular embodiment, the weld deposit has a CVN energy in the as-welded condition greater than about 30 J, about 35 J, about 40 J, about 45 J, about 50 J, about 55 J, about 60 J, about 65 J, about 70 J, about 75 J, or about 80 J.

In another embodiment, after the application of the weld metal, the high manganese steel HAV has a CVN energy in the as-welded condition greater than about 27 J at −29° C. In a particular embodiment, the high Mn steel HAV has a CVN energy in the as-welded condition greater than about 30 J, about 35 J, about 40 J, about 45 J, about 50 J, about 55 J, about 60 J, about 65 J, about 70 J, about 75 J, or about 80 J at −29° C.

In another embodiment, after the application of the weld metal, the low carbon steel HAZ has a CVN energy in the as-welded condition greater than about 27 J at $^-29°$ C. In a particular embodiment, the low carbon steel0 HAZ has a CVN energy in the as-welded condition greater than about 30 J, about 35 J, about 40 J, about 45 J, about 50 J, about 55 J, about 60 J, about 65 J, about 70 J, about 75 J, or about 80 J at $^-29°$ C.

Weldability:

The novel DMW-HMS weld metal can provide the required weldability to join erosion resistant HMS to low carbon steel. This weldability is achieved through proper control of weld metal chemistry, welding process parameters, and weld joint design.

In an embodiment, the DMW-HMS weld metals solidify as primary austenite. Primary austenite structure may be susceptible to weld solidification cracking. Any weld solidification cracking is unacceptable for fabrication of oil sands components, including slurry pipelines, and thus the DMW-HMS weld metals must provide adequate resistance to solidification cracking during welding using practical welding parameters. Proper control of weld metal chemistry can help to avoid solidification cracking in DMW-HMS weld metals. Control of the consumable wire composition can help to ensure proper levels of alloying elements and minimum levels of impurity elements, such as sulfur and phosphorus. Dilution of the base metals must be managed to ensure that the weld metal composition range is within the proper range. The base metal HMS has significantly higher carbon content than the DMW-HMS welding consumable, and thus can have greater dilution, which leads to greater solidification cracking susceptibility. In an embodiment, the dilution level is controlled by restricting the maximum heat input. In another embodiment, the dilution level is controlled by a prescribed weld bead sequence. Solidification cracking is also dependent on the magnitude and location of weld residual stresses that develop during weld metal solidification. In an additional embodiment, specific weld bevel geometries are used to provide more favorable weld residual stresses and improve resistance to solidification cracking in the DMW-HMS weld metals. For example, in an embodiment, open bevels with larger included angles result in weld beads with lower depth-to-width ratios. This can reduce solidification cracking susceptibility, as compared to narrow bevels with smaller included angles and larger thermally induced stresses. Thermally induced stresses can also be controlled by ensuring proper fit up alignment of the dissimilar metal components. As such, the HMS components and the low carbon steel components should be properly controlled within the dimensional tolerances specified.

Welding Process Parameters and Welding Application:

According to another embodiment of the present disclosure, a system for applying the weld metal of the present disclosure is provided. The system may use welding equipment and parameters to control of weld arc stability and weld pool flow characteristics, such as viscosity and bead shape to provide acceptable weldability. The system for providing welds for joining high Mn steel and low carbon steel comprises a consumable wire electrode and a gas metal arc welding power source that perform gas metal arc welding. The consumable wire electrode comprises the weld metal as described above. For example, the wire electrode comprises carbon in a range of about 0.1 wt % to about 0.4 wt %, manganese in a range of about 15 wt % to about 25 wt %, chromium in a range of about 2.0 wt % to about 8.0 wt %, molybdenum in an amount of less than or equal to about 2.0 wt %, nickel in an amount of less than or equal to about 10 wt %, silicon in an amount of less than or equal to about 0.70 wt %, sulfur in an amount of less than or equal to about 100 ppm, phosphorus in an amount of less than or equal to about 200 ppm, and a balance comprising iron. The gas metal arc welding power source produces a welding heat input no more than about 2.5 kJ/mm. In another embodiment, the welding heat input is in a range of about 0.6 kJ/mm (about 15 kJ/inch) to about 1.0 kJ/mm (about 25 kJ/inch).

The application of sound DMW-HMS welds produced at practical productivity for slurry pipeline construction can be accomplished with recently developed welding technology. Industry available GMAW welding machines enable good weldability for DMW-HMS welds. Manufacturers of GMAW power sources have incorporated advanced pulsed waveform control through the use of sophisticated solid state electronics. This waveform control allows for improvement and optimization of weldability. This type of welding is typically referred to as pulsed GMAW or PGMAW. These PGMAW machines have been in existence for many years, yet only recently have waveform controls become advanced enough to enable the level of optimization most beneficial for ER-HMS field construction.

In an embodiment, a DMW-HMS weld is produced with a GMAW welding machine. In a particular embodiment, the DMW-HMS weld is applied with a pulsed GMAW (PGMAW). The DMW-HMS consumable chemistries can be welded in multiple welding positions (1G-flat, 2G-horizontal, 3G-vertical, 4G-overhead, 5G-pipe horizontal) using, e.g., commercially available GMAW welding machines. The welding consumables can be applied as stringer beads or weave beads. Parameters can be selected to ensure proper base metal tie in and fusion on both the HMS side of the weld and the low carbon steel side of the weld.

In a particular embodiment, a low carbon steel ring is joined to the outside of a HMS slurry pipe during field slurry pipeline construction. In another embodiment, the DMW-HMS welds are made using GMAW-based processes, e.g., PGMAW. Other processes can be used provided that the specified chemistry and microstructure are achieved and the weldability is satisfactory for the application. Several examples of power supplies that can be used are the Fronius TransSynergic 3200, the Lincoln Power Wave 455, and the Miller PipePro 450.

The system for applying the DMW-HMS welds to join low carbon steel (e.g., low carbon steel rings) to HMS (e.g., the outside of erosion resistant HMS slurry pipe) can include semi-automatic GMAW welding using cored wire consumables (metal core or flux core). Welding can be performed with a current of about 100 to about 180 amps. The arc voltage can be in a range from about 15V to about 30V. The wire feed speed can range from about 80 to about 500 ipm for about 1.2 mm diameter wire. Furthermore, welding can be performed with a welding shielding gas flow rate in a range of about 10 to about 50 cfh. In another embodiment, a filler wire with a diameter in a range from about 1.2 mm to about 1.6 mm, which can have a travel speed in a range of about 1 to about 18 ipm for root, fill and cap passes, and/or. In some embodiments, welding is performed with a heat input less than about 2.5 kJ/mm (63.5 kJ/inch). In a particular embodiment, the welding is performed with a heat input less than about 1.97 kJ/mm (50 kJ/inch). The heat input can be in a range of about 0.59 kJ/mm (about 15 kJ/inch) to about 1.02 kJ/mm (about 26 kJ/inch).

According to another embodiment of the present disclosure, a method for applying the weld metal of the present disclosure is provided. The method uses, e.g., welding equipment and parameters that enable control of weld arc stability and weld pool flow characteristics, such as viscosity and bead shape to provide acceptable weldability. In an embodiment, the weld metal chemistry, weld joint geometry, and welding input are controlled to ensure the strength and toughness of the weld metal and prevent significant degradation of heat affected zone (HAZ) toughness.

The method of producing a weld deposit for joining high Mn steel and low carbon steel comprises: providing a high Mn steel base and a low carbon steel base to be welded and a welding filler metal; and melting and cooling the welding filler material to create a weld deposit. The welding filler metal comprises carbon in a range of about 0.1 wt % to about 0.4 wt %, manganese in a range of about 15 wt % to about 25 wt %, chromium in a range of about 2.0 wt % to about 8.0 wt %, molybdenum in an amount of less than or equal to about 2.0 wt %, nickel in an amount of less than or equal to about 10 wt %, silicon in an amount of less than or equal to about 0.70 wt %, sulfur in an amount of less than or equal to about 100 ppm, phosphorus in an amount of less than or equal to about 200 ppm, and a balance comprising iron.

In certain embodiments, melting comprises applying a welding heat input of about 2.5 kJ/mm or less to the welding filler metal/welding consumable wire composition.

In a particular embodiment, the high Mn steel base and/or the carbon steel base metal comprise a portion to be welded, the portion(s) having bevels of greater than about 25 degrees.

An embodiment of the present disclosure comprises a method of producing DMW-HMS welds for specific application requirements. The method comprises determining the desired DMW-HMS weld metal chemistry within the effectiveness ranges disclosed herein. In an embodiment, the method includes determining the welding consumable wire chemistry given the base metal chemistries and the desired weld metal chemistry, which can comprise performing dilution calculations as discussed previously. In another embodiment, the method further comprises welding the base metal using the welding consumable wire. In a particular embodiment, the welding includes controlling the arc stability and weld pool flow characteristics during welding to provide satisfactory weldability and weld fusion.

EXAMPLES

Examination of DMW-HMS Weld Metal: Lab scale testing of DMW-HMS weld metal was performed. A semi-automatic GMAW process was performed with the following parameters: a current of about 120 to 145 amps; an arc voltage typically of about 20V to about 30V; a wire feed speed of about 220 to 250 ipm for 1.2 mm diameter wire; a shielding gas flow rate of about 40 to about 50 cfh; a travel speed of about 3 to about 8 ipm for root, fill and cap passes; a filler wire diameter of about 1.2 mm; and a heat input of about 18-50 kJ/inch. The properties (e.g., yield strength, tensile strength, etc.) of the test welds are shown in Table 1.

TABLE 1

Example weld metal chemistries and associated properties for several test welds.

| Weld | | C | Mn | Mo | Ni | Cr | Si | Ti | Av. YS (MPa) | Av. TS (MPa) | Av. El (%) | Av. $EJ_{RT°C}$ | Av. $EJ_{-29°C}$ |
|---|---|---|---|---|---|---|---|---|---|---|---|---|---|
| PT-400MN2 | POSCO | 0.2 | 20 | 0.98 | 7 | 4.59 | 0.6 | — | 411.6 | 501.9 | 26 | 100 | WCL: 85 |
| PT-400MN2 | URC | 0.239 | 21.62 | 0.942 | 6.675 | 5.36 | 0.579 | — | — | 563 | — | — | WCL: 89 CS FL: 81 CS FL +2: 177 |

The ultimate tensile strength and CVN impact toughness at −29° C. of the weld metal are shown in Table 2 and compared to weld requirements for a joint between erosion resistant HMS slurry pipe with API X70 grade based strength requirements and a low carbon steel ring (ASME SA-516 Grade 70 material). The DMW-HMS weld metal tensile strength must be greater than the specified minimum ultimate tensile strength (SMUTS) of the lower strength material, the low carbon steel ring. The SMUTS for the erosion resistant HMS material is 82.7 ksi, and the SMUTS for the low carbon steel is 70 ksi. As such, the DMW-HMS weld metal must be greater than 70 ksi (the lower of the two SMUTS values). Modifications to DMW-HMS weld metal chemistry can be made within the ranges disclosed here to achieve the required weld metal tensile properties for a range of potential erosion resistant HMS to low carbon steel joints. Table 2 also shows impact toughness (CVN) values achieved with produced DMW-HMS test welds and compared to weld impact toughness requirements for slurry pipe application.

TABLE 2

Weld metal mechanical properties for a carbon steel-HMS test weld.

| Mechanical Property | Requirement | DMW-HMS Weld Test Result |
|---|---|---|
| Ultimate Tensile Strength | >70 ksi | Av UTS: 81.7 ksi |
| CVN Impact Toughness (@-29° C.) | >27 J | Av Weld Centerline: 89 J |
| | | Av Carbon Steel HAZ Fusion Line: 81 J |
| | | Av Carbon Steel HAZ FL + 2 mm: 177 J |

Qualification of Field Welding Procedure. Table 3 shows the average test results for carbon steel-HMS welds produced as part of the qualification of the welding procedure. The qualification weld results are shown, along with the required values. The carbon steel-HMS welding procedure demonstrated superior impact toughness values for the weld metal, the high Mn steel, and the low carbon steel, as well as cross-weld tensile strength.

TABLE 3

Weld metal properties for carbon steel-HMS weld.

| PQR Tests | Requirement | Carbon Steel-HMS Procedure Qualification Weld Result |
|---|---|---|
| Cross-Weld Tensile | >70 ksi | Av UTS: 86.5 Ksi (ductile fracture in carbon steel base metal) |
| Side Bend | No open discontinuity greater than 3 mm | 4 out of 4 acceptable |
| CVN WCL (@ −45° C.) | >27 J | Av: 95.8 J |
| CVN HMS FL (@ −45° C.) | >27 J | Av: 56.5 J |
| CVN HMS FL + 2 mm (@ −45° C.) | >27 J | Av: 35.7 J |
| CVN HMS FL + 5 mm (@ −45° C.) | >27 J | Av: 35.3 J |
| CVN CS FL (@ −45° C.) | >27 J | Av: 48.4 J |
| CVN CS FL + 2 mm (@ −45° C.) | >27 J | Av: 144.2 J |
| CVN CS FL + 5 mm (@ −45° C.) | >27 J | Av: 141.0 J |

The embodiment described above can produce HMS to low carbon steel welds that satisfy all requirements for fabricating and applying erosion resistant HMS slurry pipelines.

Proper control of the welding shielding gas composition is key in producing sound carbon steel HMS welds with the required properties. The viscous nature of the DMW-HMS weld metals is overcome through the use of $CO_2$ in the shielding gas. The $CO_2$ in the shielding gas serves to improve weld pool fluidity, arc stability, and bead geometry including penetration profile. All of these attributes are important to avoid weld defects during welding. The use of $CO_2$, however, increases the oxygen potential and can increase oxygen content in the weld metal. Excessive formation of oxides in the weld metal can result in degraded toughness. Therefore, the amount of $CO_2$ in the shielding gas should be controlled between 10% and 30%. A preferred embodiment of the DMW-HMS weld technology applies a shielding gas with a composition of 80% Ar/20% $CO_2$.

The weld bead profiles of DMW-HMS welds should be properly controlled to minimize risk of solidification cracking. Highly concave bead profiles should be avoided, as these are susceptible to solidification cracking. The bead profiles can be controlled with proper control of welding current, wire feed speed, and welding travel speed.

When using cored wire consumables to apply DMW-HMS welds, it is important to avoid typical welding problems that can be associated with cored wire welding processes such as MCAW and FCAW. Such potential problems include excessive spatter and weld metal porosity. The use of $CO_2$ in the shielding gas, as described above, will reduce spatter. Weld metal porosity can be reduced or avoided through proper cleaning practices. The weld joint and consumable wire should be kept dry and clean, free from oil and other debris. Proper consumable wire storage practices (temperature and humidity) should be followed, as cored wire consumables have a greater tendency than solid wire consumables to collect moisture when stored improperly.

The welding process parameters can be controlled to produce a welding heat input that results in sounds DMS-HMS welds with suitable microstructures and properties for the slurry pipe application. The welding heat input should be high enough to enable consistent fusion at practical productivities for pipeline welding. It should be controlled, however, below a maximum of about 2.5 kJ/mm to ensure a weld that meets the requirements. Welding parameters (current, voltage, and travel speed) can be adjusted to ensure the welding heat input value is not exceeded. Excessive heat input beyond the maximum can result in a number of potential issues, including: solidification cracking, reduced weld metal toughness, and reduced base metal HAZ toughness.

Welding heat input can be controlled below the maximum value to avoid producing large weld beads with high depth to width ratios that can be prone to solidification cracking. These high depth to width ratios can increase segregation in the weld metal and increase transverse strains in the weld joint, thus increasing the likelihood of solidification cracking.

Further, welding heat input control is key to maintaining the required toughness in the HMS base metal HAZ and the low carbon steel base metal HAZ. For the HMS base metal HAZ, it is understood that a heat input that is too high will result in excessive carbide precipitation on grain boundaries in the HMS base metal HAZ. This can lead to local areas with reduced toughness. Welding heat input controlled below the maximum value results in a thermal cycle and cooling rate that produces a reduced amount of carbide precipitates at the HAZ grain boundaries. This improves the fracture toughness and resistance to cracking. Proper heat input control, therefore, is needed to ensure the required toughness is met in both the DMW-HMS weld metal and the HMS base metal HAZ. Control of heat input also reduces the formation of low toughness microstructures (such as martensite) in the low carbon steel base metal HAZ.

Proper application of the weld metal chemistries, welding processes, and welding practices described above will produce suitable DMW-HMS welds with microstructures and mechanical properties required to construct HMS slurry pipelines. The novel DMW-HMS weld metal can be applied at practical productivities using modern pipeline welding equipment in both the 1G, 2G, 3G, 4G, and 5G welding positions.

Whereas the disclosure has been described principally in connection with steel compositions for use in components for the oil, gas and/or petrochemical industry/systems/applications, such descriptions have been utilized only for purposes of disclosure and are not intended as limiting the disclosure. To the contrary, it is to be recognized that the disclosed steel compositions are capable of use in a wide variety of applications, systems, operations and/or industries.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A method of producing a weld deposit, the method comprising:
  providing at least two base metals to be welded that include a high Mn steel base metal and a low carbon steel base metal, and
  a welding filler metal consisting of:
    carbon in a range of about 0.1 wt % to about 0.4 wt %,
    manganese in a range of about 15 wt % to about 25 wt %,
    chromium in a range of about 2.0 wt % to about 8.0 wt %,
    molybdenum in an amount of less than or equal to about 2.0 wt %,
    nickel in an amount of less than or equal to about 10 wt %,
    silicon in an amount of less than or equal to about 0.7 wt %,
    titanium in an amount less than or equal to about 0.7 wt %,
    sulfur in an amount of less than or equal to about 100 ppm,
    phosphorus in an amount of less than or equal to about 100 ppm, and
    a balance of iron and impurities; and
  wherein the high Mn steel base metal has a carbon content greater than the welding filler metal;
  melting and cooling the welding filler metal to create a weld deposit between the high Mn steel base metal and the low carbon steel base metal.

2. The method of claim 1, wherein the melting comprises providing a welding heat input of no more than 2.5 kJ/mm to the welding filler metal.

3. The method of claim 1, wherein the at least two base metals comprise a portion to be welded, the portion to be welded of each of the at least two base metals having bevels of greater than 25 degrees.

4. The method of claim 1, wherein the weld deposit has a yield strength in the as-welded condition greater than a yield strength of the low carbon steel base metal and/or the high Mn steel base metal.

5. The method of claim 4, wherein at least one of: the weld deposit has a yield strength in the as-welded condition greater than about 60 ksi; the weld deposit has an ultimate tensile strength in the as-welded condition greater than about 70 ksi; or a combination thereof.

6. The method of claim 4, wherein the weld deposit has a Charpy V-notch impact energy in the as-welded condition greater than about 27 J at about −29° C.

7. The method of claim 4, wherein a heat affected zone of the high Mn steel base metal and the low carbon steel base metal have a Charpy V notch impact energy after welding greater than about 27 J at about −29° C.

8. The method of claim 1, wherein the welding filler metal composition consists of: carbon in a range of about 0.1-0.3 wt %; manganese in a range of about 18.0-22.0 wt %; chromium in a range of about 3.5-6.5 wt %; molybdenum in an amount of less than about 1.5 wt %; nickel in a range of about 5.5-8.5 wt %; silicon in a range of about 0.4-0.7 wt %; sulfur in an amount less than about 100 ppm; titanium in an amount of not greater than about 0.7 wt %; and a balance of iron and impurities.

* * * * *